United States Patent
Choi et al.

(10) Patent No.: US 9,846,642 B2
(45) Date of Patent: Dec. 19, 2017

(54) EFFICIENT KEY COLLISION HANDLING

(71) Applicant: Samsung Electronics Co., Ltd., Suwon-si, Gyeonggi-do (KR)

(72) Inventors: Changho Choi, Fremont, CA (US); Taeil Um, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 371 days.

(21) Appl. No.: 14/686,755

(22) Filed: Apr. 14, 2015

(65) Prior Publication Data

US 2016/0110292 A1    Apr. 21, 2016

Related U.S. Application Data

(60) Provisional application No. 62/066,875, filed on Oct. 21, 2014.

(51) Int. Cl.
*G06F 17/30* (2006.01)
*G06F 12/02* (2006.01)
*G06F 12/0866* (2016.01)

(52) U.S. Cl.
CPC ...... *G06F 12/0246* (2013.01); *G06F 12/0866* (2013.01); *G06F 17/30* (2013.01);
(Continued)

(58) Field of Classification Search
CPC .. G06F 12/0246; G06F 12/0866; G06F 17/30; G06F 2212/1016; G06F 2212/313;
(Continued)

(56) References Cited

U.S. PATENT DOCUMENTS

| | | | | |
|---|---|---|---|---|
| 4,972,315 A * | 11/1990 | Yamasaki | ............. | G06F 9/4436 712/201 |
| 5,640,525 A * | 6/1997 | Yumoto | ................ | G06F 9/4436 712/201 |
| 5,920,900 A * | 7/1999 | Poole | ................ | G06F 17/30949 707/E17.036 |
| 6,578,026 B1 * | 6/2003 | Cranston | ........... | G06F 17/30327 707/696 |
| 6,687,815 B1 * | 2/2004 | Dwyer, III | ............. | G11C 16/20 710/104 |
| 6,792,432 B1 * | 9/2004 | Kodavalla | ......... | G06F 17/30348 |
| 7,043,494 B1 * | 5/2006 | Joshi | ................ | G06F 17/30961 |
| 7,403,137 B1 * | 7/2008 | Huang | .................... | H03M 7/30 341/106 |
| 7,640,497 B1 * | 12/2009 | Black | .................. | G06F 17/3092 715/249 |

(Continued)

OTHER PUBLICATIONS

Bagwell P., "Ideal Hash Trees", EPFL Technical Report, 2001, 19 pages.*

(Continued)

*Primary Examiner* — Phuong Thao Cao
(74) *Attorney, Agent, or Firm* — Renaissance IP Law Group LLP

(57) ABSTRACT

Inventive aspects include a key value store engine including non-volatile memory configured to store key-value inode descriptors each including a key and an associated value. The key value store engine can include a volatile memory to store a key hash tree and a collision hash tree. The key hash tree can include nodes each having a hash of one of the keys. The collision hash tree can include nodes each having a collided hash associated with two or more different keys. Each of the nodes of the key hash tree can include a collision flag indicating whether two or more different hashes correspond to a collided hash. The volatile memory can store a collision linked list including linked list nodes each having a key-value inode number indicating a location of a corresponding key-value inode descriptor stored in the non-volatile memory. The key value store engine can include a key value logic section.

13 Claims, 9 Drawing Sheets

(52) U.S. Cl.
CPC .............. *G06F 17/30312* (2013.01); *G06F 2212/1016* (2013.01); *G06F 2212/214* (2013.01); *G06F 2212/313* (2013.01); *G06F 2212/466* (2013.01); *G06F 2212/7201* (2013.01)

(58) Field of Classification Search
CPC ......... G06F 2212/466; G06F 2212/214; G06F 2212/7201; G06F 17/30312
USPC ........................................................ 707/747
See application file for complete search history.

(56) References Cited

U.S. PATENT DOCUMENTS

| | | | |
|---|---|---|---|
| 7,895,211 B2* | 2/2011 | Loeb | G06F 17/3033 707/747 |
| 7,990,973 B2 | 8/2011 | Hao et al. | |
| 8,024,545 B2 | 9/2011 | Kim et al. | |
| 8,185,795 B1* | 5/2012 | Krigovski | H03M 13/373 714/751 |
| 8,261,098 B2 | 9/2012 | Min et al. | |
| 8,266,150 B1* | 9/2012 | Lin | G06F 17/30619 707/741 |
| 8,312,066 B2* | 11/2012 | Jagannathan | H04L 49/3009 707/899 |
| 8,345,685 B2 | 1/2013 | Shavitt et al. | |
| 8,397,051 B2* | 3/2013 | Beaman | G06F 12/109 711/208 |
| 8,745,316 B2* | 6/2014 | Yin | G06F 17/30949 707/711 |
| 8,874,842 B1* | 10/2014 | Kimmel | G06F 3/0611 711/100 |
| 9,223,612 B1* | 12/2015 | Feldman | G06F 9/465 |
| 9,229,869 B1* | 1/2016 | Parakh | G06F 12/084 |
| 9,329,991 B2* | 5/2016 | Cohen | G06F 12/0246 |
| 9,348,752 B1* | 5/2016 | Parakh | G06F 12/0802 |
| 9,519,486 B1* | 12/2016 | Blott | G06F 9/3867 |
| 9,652,444 B2* | 5/2017 | El-Saban | G06F 17/241 |
| 9,659,077 B2* | 5/2017 | Chen | G06F 17/30581 |
| 2003/0030575 A1* | 2/2003 | Frachtenberg | H03M 7/3088 341/51 |
| 2003/0061495 A1* | 3/2003 | Minnick | H04L 63/0485 713/189 |
| 2004/0122837 A1* | 6/2004 | Lee | G06F 17/30327 |
| 2004/0205056 A1* | 10/2004 | Mori | G06F 7/02 |
| 2005/0066122 A1* | 3/2005 | Longinov | G06F 11/2064 711/113 |
| 2005/0172082 A1* | 8/2005 | Liu | G06F 12/0862 711/144 |
| 2006/0253438 A1* | 11/2006 | Ren | G06F 17/30616 |
| 2006/0271540 A1* | 11/2006 | Williams | G06F 17/30067 |
| 2007/0198741 A1* | 8/2007 | Duffy | G06F 17/30899 709/245 |
| 2008/0077607 A1* | 3/2008 | Gatawood | H03M 7/3084 |
| 2008/0109395 A1* | 5/2008 | Loeb | G06F 17/3033 |
| 2008/0154852 A1* | 6/2008 | Beyer | G06F 12/0864 |
| 2008/0155229 A1* | 6/2008 | Beyer | G06F 17/10 711/216 |
| 2008/0215849 A1* | 9/2008 | Scott | G06F 17/30949 711/216 |
| 2010/0110935 A1* | 5/2010 | Tamassia | H04L 63/12 370/256 |
| 2010/0212017 A1* | 8/2010 | Li | G06F 21/57 726/26 |
| 2011/0016152 A1* | 1/2011 | Popovski | G06F 3/0608 707/797 |
| 2011/0055174 A1* | 3/2011 | Popovski | G06F 17/30312 707/693 |
| 2011/0128959 A1* | 6/2011 | Bando | H04L 45/745 370/392 |
| 2011/0128960 A1* | 6/2011 | Bando | H04L 45/745 370/392 |
| 2011/0219168 A1* | 9/2011 | Stephens | G06F 12/0246 711/103 |
| 2011/0276744 A1* | 11/2011 | Sengupta | G06F 12/0866 711/103 |
| 2011/0295851 A1* | 12/2011 | El-Saban | G06F 17/3082 707/728 |
| 2012/0117067 A1* | 5/2012 | Yakubovich | G06F 17/30327 707/737 |
| 2012/0136889 A1* | 5/2012 | Jagannathan | H04L 49/3009 707/769 |
| 2013/0007008 A1* | 1/2013 | Yuan | G06F 17/30949 707/747 |
| 2013/0042060 A1* | 2/2013 | Marukame | G06F 17/30982 711/108 |
| 2013/0054869 A1* | 2/2013 | Tolia | G06F 12/0871 711/102 |
| 2013/0250686 A1* | 9/2013 | Marukame | G11C 16/08 365/185.12 |
| 2013/0268770 A1* | 10/2013 | Hunt | G06F 17/3033 713/189 |
| 2013/0275656 A1* | 10/2013 | Talagala | G06F 12/0246 711/103 |
| 2013/0339643 A1* | 12/2013 | Tekade | G06F 17/30581 711/162 |
| 2013/0346719 A1* | 12/2013 | Tomlinson | G06F 12/10 711/165 |
| 2014/0013027 A1* | 1/2014 | Jannyavula Venkata | G06F 12/0866 711/103 |
| 2014/0047040 A1* | 2/2014 | Patiejunas | H04L 51/24 709/206 |
| 2014/0108416 A1* | 4/2014 | Hornkvist | G06F 17/30336 707/741 |
| 2014/0136759 A1* | 5/2014 | Sprouse | G06F 12/0246 711/103 |
| 2014/0136760 A1* | 5/2014 | Sprouse | G06F 12/0246 711/103 |
| 2014/0136762 A1* | 5/2014 | Li | G06F 12/0246 711/103 |
| 2014/0208004 A1* | 7/2014 | Cohen | G06F 12/0246 711/103 |
| 2014/0325115 A1* | 10/2014 | Ramsundar | G06F 12/0238 711/102 |
| 2014/0337375 A1* | 11/2014 | Yue | G06F 17/30424 707/769 |
| 2014/0337593 A1* | 11/2014 | Holbrook | G06F 3/0614 711/162 |
| 2015/0126288 A1* | 5/2015 | Okino | G11B 20/10527 463/43 |
| 2015/0370794 A1* | 12/2015 | Yochai | G06F 17/30097 707/747 |
| 2016/0085585 A1* | 3/2016 | Chen | G06F 12/08 711/154 |
| 2016/0099810 A1* | 4/2016 | Li | H04L 9/0894 713/193 |
| 2016/0110292 A1* | 4/2016 | Choi | G06F 12/0866 711/103 |
| 2016/0203053 A1* | 7/2016 | Talagala | H04L 67/1097 714/6.12 |
| 2016/0313934 A1* | 10/2016 | Isherwood | G06F 17/30215 |

OTHER PUBLICATIONS

Lu et al., "BloomStore: Bloom-Filter Based Memory-Efficient Key-Value Store for Indexing of Data Deduplication on Flash", 2012 IEEE 28th Symposium on Mass Storage Systems and Technologies (MSST), IEEE, 2012, 11 pages.*

Zhang et al., "Design of Hash-Tree Anti-Collision Algorithm", in Proceedings of the Third International Conference on Natural Computation (ICNC 2007), 2007, 4 pages.*

* cited by examiner

EFFICIENT KEY COLLISION HANDLING

RELATED APPLICATION DATA

This application claims the benefit of U.S. patent application Ser. No. 62/066,875, filed Oct. 21, 2014, which is hereby incorporated by reference.

BACKGROUND

The present inventive concepts relate to key value stores, and more particularly, to a system and method for efficiently handling key collisions when accessing data in a key value store.

A key value store is a type of computer database that can be used in data-intensive, high-performance, scale-out computing environments. Key value stores allow computer applications to store schema-less data. Schema-less data can include structures having a string that represents the key and the actual data that is considered the value in a "key-value" relationship. Such key-value structures replace the need for fixed data models and also allow for proper formatting.

Key value stores consider a flash memory device or a solid state disk/drive (SDD) as a block device. Thus, a key value store maintains its own mapping which, in many cases, can be redundant to mappings maintained by a Flash Translation Layer (FTL) of the flash memory or SDD. Conventionally, the mapping maintained by the key value store includes the actual key. This is needed to check for hash collisions and key over-write scenarios (unless a key value store library sacrifices an I/O for this purpose). But keeping all of the keys in memory requires significant memory. On the other hand, issuing extra I/Os to read a key degrades performance. For example, in case of hash collisions, on writes, the key can be rehashed and mapped to a new logical block address (LBA). However, such remapping effort fails if the same key is being over-written. On reads, the key value library might need to issue multiple reads and validate the requested key with the actual key stored on non-volatile media before returning the value associated with the requested key. Embodiments of the present inventive concept address these and other limitations in the prior art.

BRIEF SUMMARY

Embodiments of the inventive concept include a key value store engine. The key value store engine can include a non-volatile memory configured to store a plurality of key-value inode descriptors each including a key from among a plurality of keys and an associated value from among a plurality of values. The key value store engine can include a volatile memory configured to store a key hash tree and a collision hash tree, the key hash tree including a first plurality of nodes each having a hash of one of the plurality of keys, the collision hash tree including a second plurality of nodes each having a collided hash associated with two different keys from among the plurality of keys.

In some embodiments, each of the first plurality of nodes includes a collision flag indicating whether two different hashes of the two different keys, respectively, correspond to a collided hash.

In some embodiments, the volatile memory is configured to store a collision linked list including a plurality of linked list nodes each having a key-value inode number indicating a location of a corresponding key-value inode descriptor from among the plurality of key-value inode descriptors stored in the non-volatile memory.

In some embodiments, each of the plurality of linked list nodes of the collision linked list includes a cached copy of a key that is digitally equivalent to a corresponding key in the corresponding key-value inode descriptor.

Embodiments of the inventive concept include a key value store system. The key value store system can include a host including one or more applications. The key value store system can include a protocol interface layer. The key value store system can include a key value store engine communicatively coupled with the host via the protocol interface layer. The key value store engine can include a non-volatile memory configured to store a plurality of key-value inode descriptors each including a key from among a plurality of keys and an associated value from among a plurality of values. The key value store engine can further include a volatile memory configured to store a key hash tree and a collision hash tree, the key hash tree including a first plurality of nodes each having a hash of one of the plurality of keys, the collision hash tree including a second plurality of nodes each having a collided hash associated with two different keys from among the plurality of keys.

Embodiments of the inventive concept include a method for providing efficient key collision handling. The method can include storing, in a non-volatile memory, a plurality of key-value inode descriptors each including a key from among a plurality of keys and an associated value from among a plurality of values. The method can include storing, in a volatile memory, a key hash tree and a collision hash tree. The method can include storing, in the key hash tree, a first plurality of nodes each having a hash of at least one of the plurality of keys. The method can include storing, in the collision hash tree, a second plurality of nodes each having a collided hash that is associated with two different keys from among the plurality of keys.

The method can further include storing, in the volatile memory, a collision linked list including a plurality of linked list nodes each having a key-value inode number indicating a location of a corresponding key-value inode descriptor from among the plurality of key-value inode descriptors stored in the non-volatile memory. The method can include receiving, by a key value logic section, a get-key request associated with a particular key from among the plurality of keys. The method can include hashing the particular key to produce a first hashed key. The method can include determining whether the first hashed key collides with a second hashed key in the key hash tree. The method can include, in response to said determining that the first hashed key collides with the second hashed key in the key hash tree, referencing the collision hash tree to distinguish between the collided first and second hashed keys. Referencing can include finding the first hashed key in the collision hash tree, accessing a pointer that is associated with the first hashed key that points to a collision linked list, walking the collision linked list until a key-value inode number is found that corresponds to a location of a corresponding key-value inode descriptor associated with the particular key stored in the non-volatile memory, and causing a particular value associated with the particular key to be read from the non-volatile memory.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
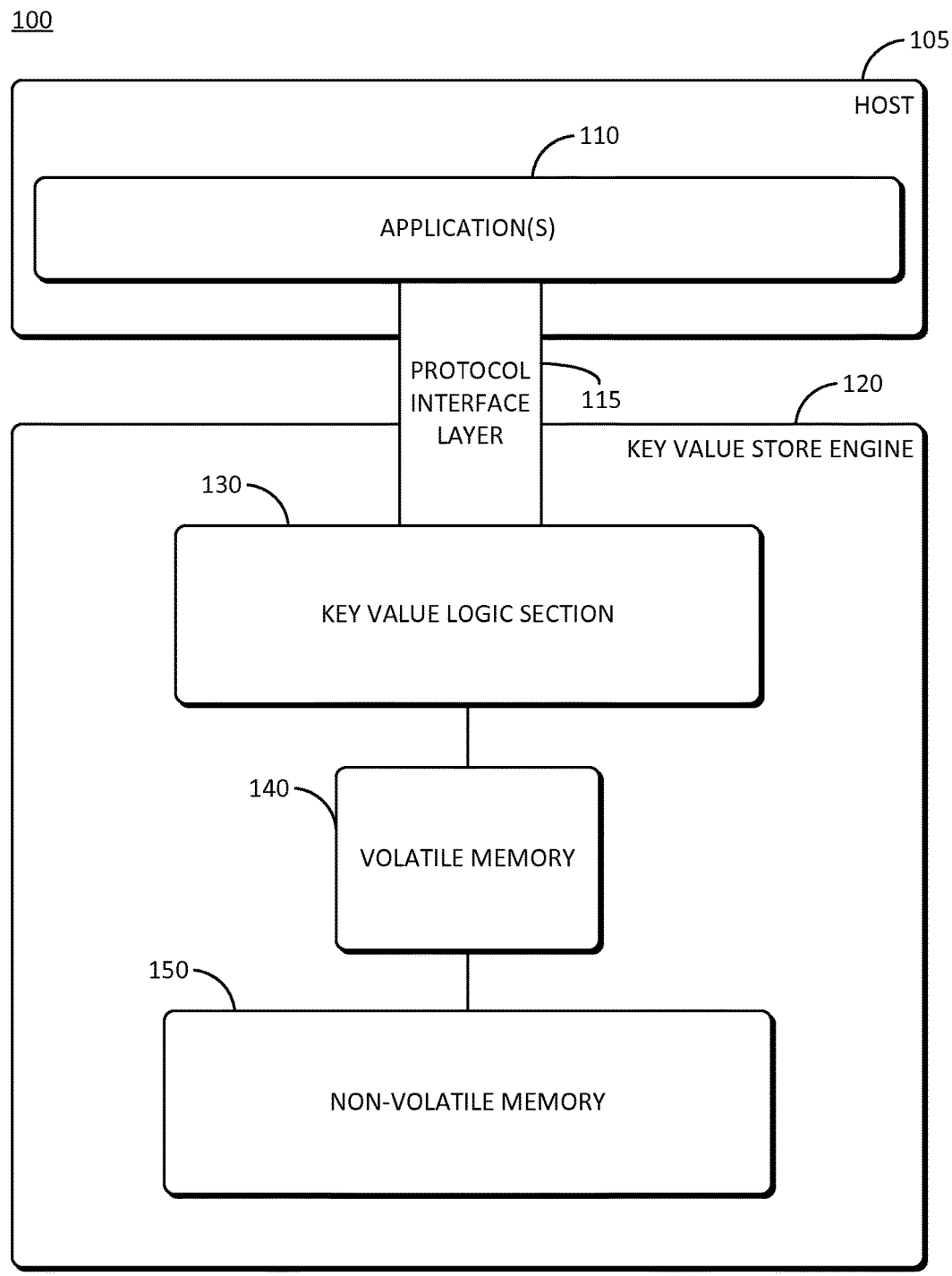
FIG. 1 is an example block diagram of a key value store system including a hash tree logic section, a volatile memory, and a non-volatile memory in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first hashed key could be termed a second hashed key, and, similarly, a second hashed key could be termed a first hashed key, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a key value store engine that can eliminate the need for multiple I/Os to non-volatile storage in the event of a key hash collision. In addition to a key hash tree, a collision hash tree is stored in volatile memory. When a hash collision occurs in the key hash tree, the collision hash tree can be referenced, which can be used to determine which of two or more collided keys is to be accessed. The collision hash tree can include a collision linked list associated with each node in the collision hash tree. The collision linked list can be walked in the event of a hash collision, and the key-value inode descriptor determined in response to finding a match with respect to the requested key.

Hence, in the event of the collision, a single I/O to a non-volatile memory can be issued rather than multiple I/Os, thereby significantly improving performance and reliability of the key value store. In other words, a single read command can support reading multiple discontiguous LBA ranges. Using this mechanism, multiple LBA ranges can be read by issuing a single I/O. Moreover, embodiments of the inventive concept can include a flash translation layer (FTL)-aware interface that eliminates the need to cache every key in system memory, thereby significantly reducing system memory usage.

FIG. 1 is an example block diagram of a key value store system 100 including a key value logic section 130, a volatile memory 140, and a non-volatile memory 150 in accordance with embodiments of the inventive concept. A host 105 can include one or more applications 110. The host 105 can be, for example, a computer, a computer server, a processor, a memory controller, a process, a user, or the like. The host 105 can be remote or local relative to the key value store engine 120. In some embodiments, the host 105 can include the key value store engine 120.

The key value store system 100 can include a protocol interface layer 115. The key value store engine 120 can be communicatively coupled with the host 105 via the protocol interface layer 115.

The key value store engine 120 can include the non-volatile memory 150. The non-volatile memory 150 can store multiple key-value inode descriptors as further described below. The non-volatile memory 150 can include one or more flash memory modules such as NAND flash modules, magnetoresistive random access memory (MRAM) modules, phase-change memory (PRAM) modules, resistive type memory modules, or the like. The non-volatile memory 150 can be a solid state drive (SDD), and is often referred to herein as such. It will be understood that any suitable non-volatile memory can be used.

The key value store engine 120 can include the volatile memory 140. The volatile memory 140 can store a key hash tree and a collision hash tree, as further described below. The volatile memory 140 can include one or more dynamic random access memory (DRAM) modules. The volatile memory 140 can be system memory, and is often referred to herein as such. It will be understood that any suitable volatile memory can be used.

The key value store engine 120 can include the key value logic section 130. The key value logic section 130 can manage the key hash tree and collision hash tree of the volatile memory 140, as further described below. The key value logic section 130 can interface with the one or more applications 110 via the protocol interface layer 115.

Figure 2:
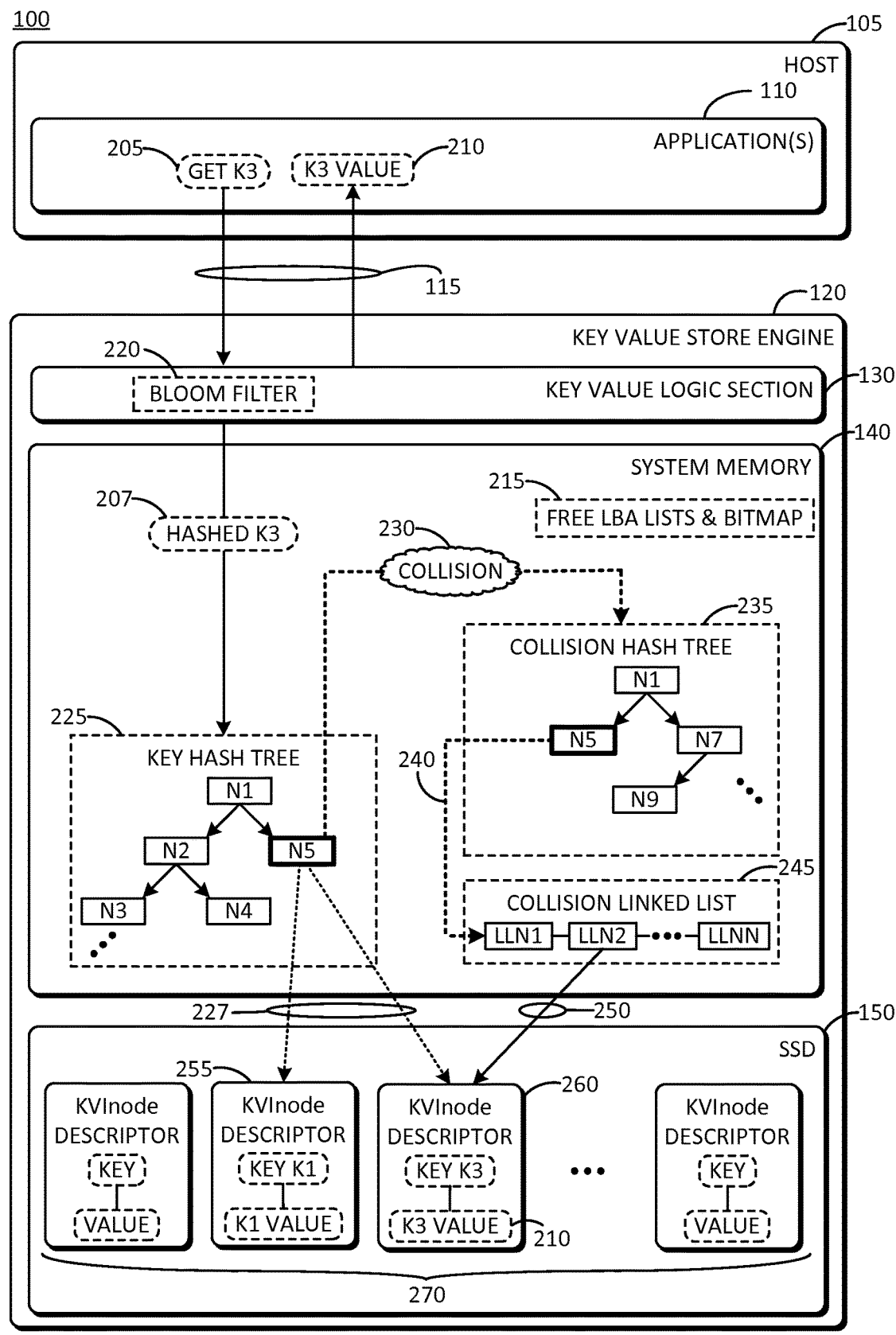
FIG. 2 is an example block diagram of the system of FIG. 1 including additional details of the various components of the system such as a key hash tree and collision hash tree in accordance with embodiments of the inventive concept.

FIG. 2 is an example block diagram of the system 100 of FIG. 1 including additional details of the various components of the system such as the key hash tree 225 and the collision hash tree 235 in accordance with embodiments of the inventive concept.

The SSD 150 can store multiple key-value inode descriptors 270 each including a key and an associated value. For example, the key-value inode descriptor 255 can include key K1 and an associated K1 value. Similarly, the key-value inode descriptor 260 can include key K3 and an associated K3 value. The key-value inode descriptors 270 can each include a key length, a value length, an actual key, and/or the actual value. In some embodiments, the key-value inode descriptors 270 can embed the actual key and actual value. In some embodiments, the key-value inode descriptors 270 can include pointers (i.e., locations within the SSD 150) of actual key-value pairs. Every key-value pair can have its own unique key-value inode descriptor stored in the SSD 150. The location of each key-value inode descriptor 270 within the SSD 150 can be cached and retrieved from the key hash tree 225.

The system memory 140 can store the key hash tree 225 and the collision hash tree 235. The key hash tree 225 can include multiple nodes (e.g., N1 through N5) each having a hash of one of multiple keys. A bloom filter 220 can be used to indicate the existence of a key in the key hash tree 225. False positives are handled by walking through the key hash tree 225. False negatives are not permitted by bloom filters in general. The key hash tree 225 holds the mapping information between a hash and a key-value inode number, as further described below. The key hash tree 225 can be indexed by the hash.

The collision hash tree 235 can include multiple nodes (e.g., N1, N5, N7, and N9) each having a collided hash associated with two or more different keys from among the multiple keys. In other words, if two or more hashes of keys correspond to the same hash (e.g., two different hashes of different keys result in the same hash) associated with node N5 of the key hash tree 225, then such node N5 can be flagged as having a hash collision 230. Such node N5 can be included in the collision hash tree 235, although with different contents as further described below, and used to distinguish between the two different keys.

When the application 110 issues a get-key request 205 for K3, for example, and a collision 230 between the hash of K3 and the hash of key K1 occurs with respect to node N5, rather than causing two separate I/Os to occur with the SSD 150, as indicated by 227, a single I/O 250 can be issued after referencing the collision hash tree 235 and walking the collision linked list 245 to find a matching key, as further described below. The collision linked list 245 can include multiple linked list nodes (e.g., LLN1, LLN2 through LLNN) each having a key-value inode number indicating a location of a corresponding key-value inode descriptor (e.g., 260) from among the multiple key-value inode descriptors 270 stored in the SSD 150. Each node of the collision hash tree 235 can have associated with it an individual collision linked list, which includes two or more linked list nodes that are associated with two or more collided key hashes.

The key value store engine 120 can include a key value logic section 130. The key value logic section 130 can receive a get-key request 205 associated with a particular key K3. The key value logic section 130 can hash the particular key K3 to produce a hashed K3 207. The hashing of the particular key K3 can be performed by one or more hashing functions. The key value logic section 130 can determine whether the hashed key K3 207 collides with another hashed key (e.g., K1) in the key hash tree 225. In response to determining that the hashed key K3 207 collides with another hashed key (e.g., K1) in the key hash tree 225, the key value logic section 130 can reference the collision hash tree 235 to distinguish between the collided hashed keys K3 and K1.

The key value logic section 130 can check a collision flag stored in a node (e.g., N5) in the key hash tree 225 that is associated with the hashed key K3 to determine whether the hashed key K3 collides with the hashed key K1 (or with some other hashed key). In response to determining that the hashed key K3 collides with the second hashed key in the key hash tree 225, the key value logic section 130 can find the hashed key K3 in the collision hash tree 235, which is stored in node N5. The key value logic section 130 can access a pointer that is associated with the hashed key K3 in node N5 of the collision hash tree 235 that points to the collision linked list 245 as shown by 240. The key value logic section 130 can walk the collision linked list 245 until a key-value inode number is found (e.g., in node LLN2) that corresponds to a location of a corresponding key-value inode descriptor (e.g., 260) associated with the particular key K3 stored in the SSD 150. The key value logic section 130 can cause a particular value (e.g., K3 value 210) associated with the particular key K3 to be read from the SSD 150 and transmitted to the one or more applications 110 of the host 105 via the protocol interface layer 115.

Alternatively or in addition, in response to determining that the hashed key K3 collides with a second hashed key such as K1 in the key hash tree 225, the key value logic section 130 can find the hashed key K3 in the collision hash tree 235, access a pointer that is associated with the hashed key K3 in the collision hash tree 235 that points to a collision linked list 245, and walk the collision linked list 245 until an actual digitally equivalent cached key K3 is found that corresponds to the particular key K3. Alternatively or in addition, the key value logic section 130 can cause a particular cached value (e.g., cached K3 value) associated with the particular key K3 to be read from the collision linked list 245 itself and transmitted to the one or more applications 110 of the host 105 via the protocol interface layer 115, as further described below.

The system memory 140 can store one or more free logical block address (LBA) lists and/or alloc bitmap 215. The free LBA lists and/or alloc bitmap 215 facilitates fast LBA allocation. The free LBA lists and/or alloc bitmap 215 can be built when the key value store engine 120 powers on by walking through LBAs on the SSD 150. The key value logic section 130 can maintain the free LBA lists and/or alloc bitmap 215 in the system memory 140, which can eliminate extra I/Os or otherwise reduce I/Os to the SSD 150. The LBA alloc bitmap 215 need not be transparent to the SSD 150 or the SSD firmware.

Figure 3:
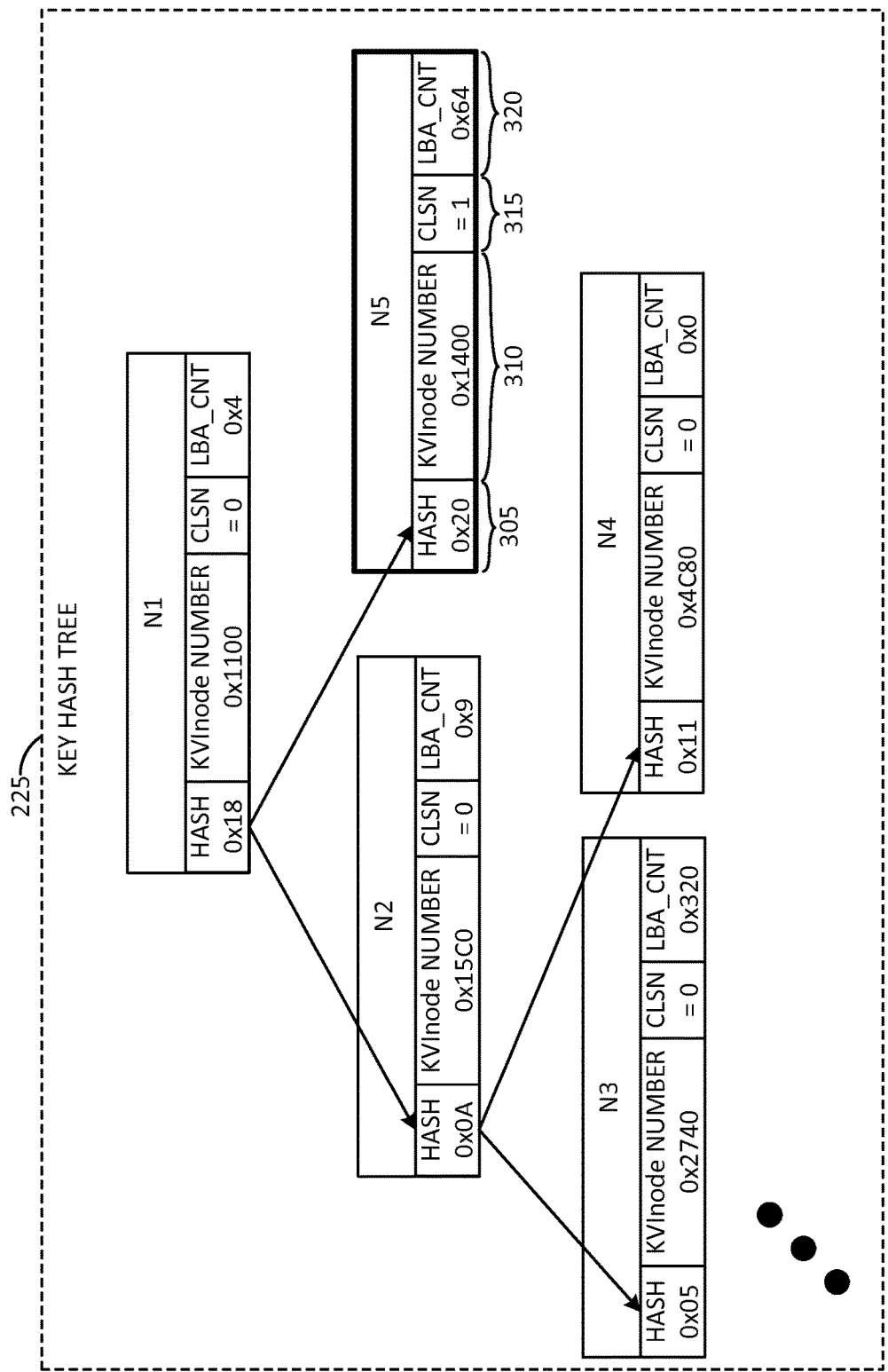
FIG. 3 is an example block diagram of the key hash tree of FIG. 2 in accordance with embodiments of the inventive concept.

FIG. 3 is an example block diagram of the key hash tree 225 of FIG. 2 in accordance with embodiments of the inventive concept. The key hash tree 225 can include multiple nodes such as nodes N1, N2, N3, N4, and N5. It will be understood that the key hash tree 225 can include any suitable number of nodes. The key hash tree 225 can be a binary tree that is indexed and searchable by key hash values. A key hash, once inserted into the key hash tree 225, need not be evicted until an application (e.g., 110 of FIG. 2) deletes the associated key. Each node can include a hash (e.g., 305), a key-value inode number (e.g., 310), a collision flag (e.g., 315), and an LBA count (e.g., 320).

The hash 305 can be a 64-bit hash of a key. The key-value inode number 310 can be a 47-bit address for a key-value inode descriptor (e.g., 260 of FIG. 2). More specifically, the key-value inode number 310 can include a particular LBA plus a byte offset within the LBA. For a given hash 305, an associated and unique key-value inode descriptor can be found at the 47-bit address in the SSD 150. The key-value inode number 310 can be a start byte address (LBA+byte offset within the LBA) where the key-value inode descriptor (e.g., 260 of FIG. 2) is stored in the SSD 150. Accordingly, key-value inode descriptors can be located by looking up key-value inode numbers. One instance of the key-value inode descriptor is stored in the SSD 150 for each key-value pair. The key-value inode number is the address in the SSD 150 where the corresponding instance of the key-value inode descriptor is saved.

The collision flag 315 can be a 1-bit value that indicates if a hash collision has occurred. For example, if the collision flag 315 has a first value such as 1, there is at minimum two keys generating the same hash value by a hash function. If the collision flag 315 has a second value such as 0, there is no hash collision, meaning that there is only one key having the hash value. Put differently, each of the nodes of the key hash tree 225 can include a collision flag 315 indicating whether two or more different hashes of two or more different keys, respectively, correspond to a collided hash. In the case of node N5, the collision flag 315 has a value of 1, indicating that two or more different hashes of two or more different keys, respectively, correspond to a collided (i.e., same) hash, and hence, the collision hash tree 235 should be referenced.

The LBA count 320 can be a 16-bit value representing the number of contiguously allocated LBAs for the key-value pair associated with the particular key-value descriptor (e.g., 260 of FIG. 2). For example, a value of 0x64 (i.e., decimal 100) can mean that 100 LBAs are allocated for the key-value pair stored at the location pointed to by the corresponding key-value inode number 310. In the case of node N5, the key-value inode number 310 has a value of 0x1400, which is the location of the key-value inode descriptor 260 of the SSD 150.

Figure 4:
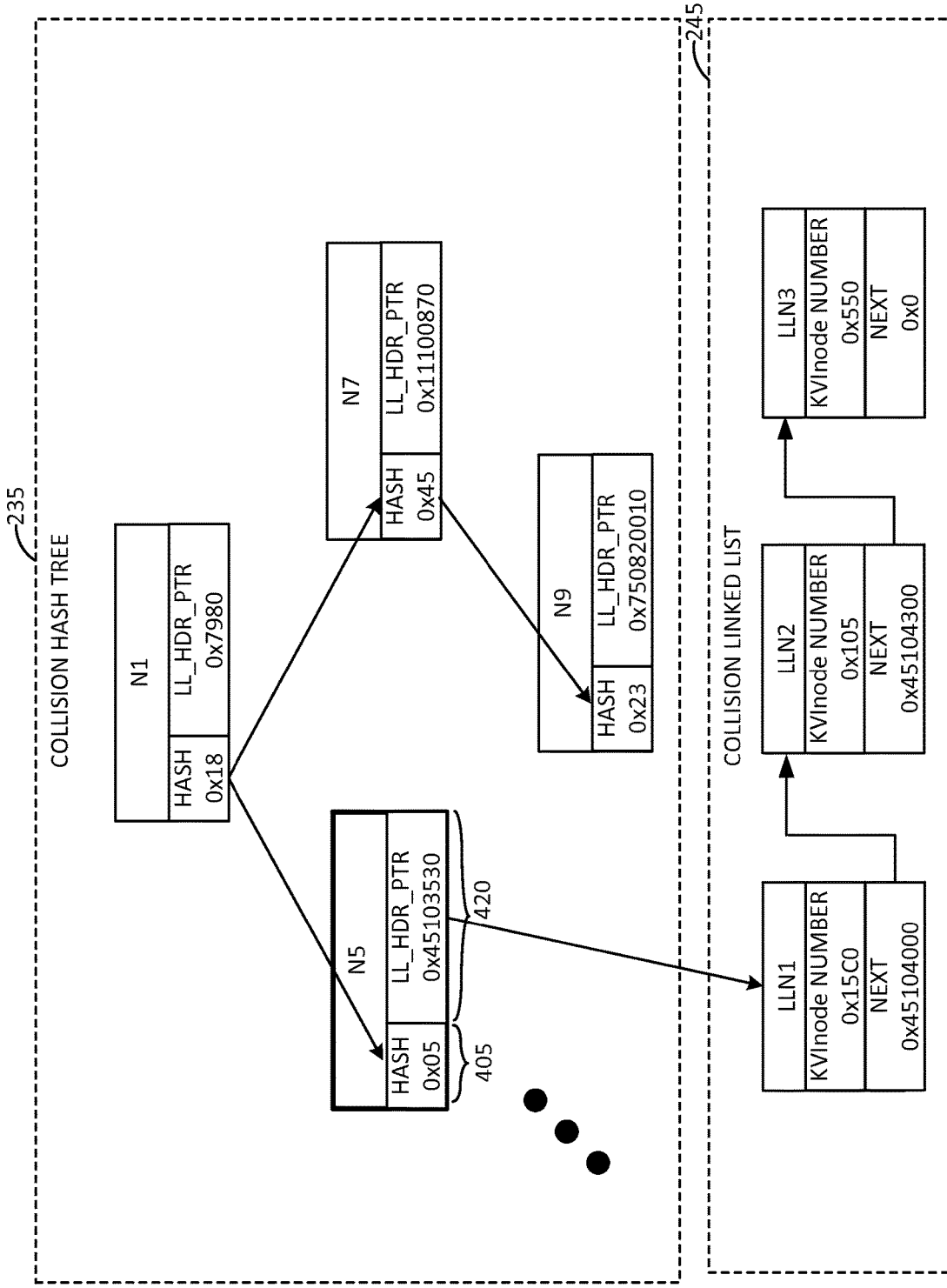
FIG. 4 is an example block diagram of the collision hash tree of FIG. 2 and a collision linked list in accordance with embodiments of the inventive concept.

FIG. 4 is an example block diagram of the collision hash tree 235 of FIG. 2 and a collision linked list 245 in accordance with embodiments of the inventive concept. The collision hash tree 235 can include multiple nodes such as nodes N1, N5, N7, and N9. It will be understood that the collision hash tree 235 can include any suitable number of nodes. The collision hash tree 235 can be a binary tree that is indexed and searchable by key hash values.

Each node can include a hash (e.g., 405) and an LL_HDR_PTR (e.g., pointer 420) that points to the head node (e.g., LLN1) of a corresponding collision linked list (e.g., 245). The hash 405 can be a 64-bit hash of a key. The pointer 420 can be a 64-bit pointer that locates the linked collision linked list header or head node LLN1. From the collision linked list 245, each of the key-value inode numbers (e.g., 0x15C0, 0x105, and 0x550) associated with the collided hash (e.g., 0x05) can be determined. The collision linked list 245 can include two or more nodes, such as nodes LLN1, LLN2, and LLN3. Each node in the collision linked list 245 can include a key-value inode number and a NEXT pointer that points to the next memory location of the next node in the list. The NEXT pointer of the final node can be a NULL value. The collision linked list 245 can cache the actual key and actual value, as further described below. Alternatively, a scattered read interface can be used.

If the collision flag (e.g., 315 of FIG. 3) has a value of 1, there are at least two different keys generating the same hash value. However, each key still has its own unique key-value inode number. To track the correct key-value inode number for each key, the collision hash tree 245 can be referenced, and when the node having the collided hash is found, the associated collision linked list 245 can be walked. Since the node N5 of the key hash table 225 (of FIG. 3) has a collision flag 315 with a value of 1, that means more than one key generates the same hash 0x5. In FIG. 4, the LL_HDR_PTR of node N5 is 0x45103530, which represents the memory address of the first node in the associated collision linked list 245. In this embodiment, three keys generated the same hash 0x5. Therefore, the collision linked list 245 includes three nodes.

Figure 5:
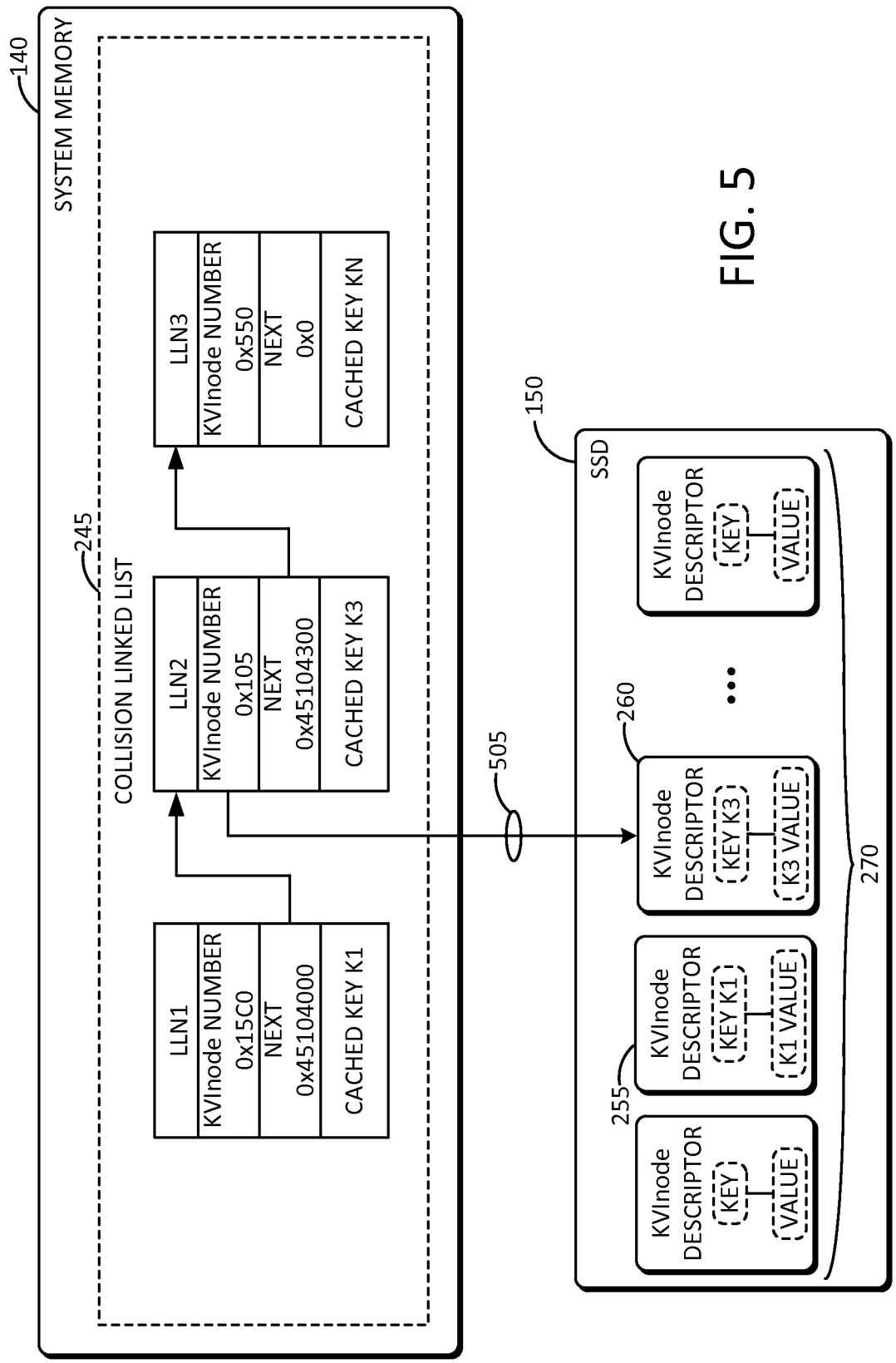
FIG. 5 is an example block diagram of the collision linked list of FIG. 2 in communication with the non-volatile memory of FIG. 2 in accordance with embodiments of the inventive concept.

FIG. 5 is an example block diagram of the collision linked list 245 in the system memory 140 of FIGS. 1 and 2 in communication with the non-volatile memory 150 of FIGS. 1 and 2 in accordance with embodiments of the inventive concept. In some embodiments, each of the nodes of the collision linked list 245 can include a cached copy of the key that is digitally equivalent to a corresponding key in the corresponding key-value inode descriptor. For example, the cached key K3 in linked list node LLN2 can be digitally equivalent to key K3 in the key-value inode descriptor 260. The key value logic section 130 can walk the collision linked list 245 and compare the requested key with the cached key to distinguish between collided key hashes. In the event of a collision, the key value logic section 130 can cause a single I/O to the SSD 150 to retrieve the corresponding key value, and transmit the K3 value to the one or more applications 110 of the host 105.

For example, in response to determining that the hashed key K3 collides with another hashed key in the key hash tree 225, the key value logic section 130 can find the hashed key K3 in the collision hash tree 235, access a pointer (e.g., LL_HDR_PTR 420 corresponding to memory location 0x45103530) that is associated with the hashed key K3 in the collision hash tree 235 that points to a collision linked list 245, and walk the collision linked list 245 until a cached key K3 is found that corresponds to the actual key K3. With the match found, the key value logic section 130 can then access the actual value stored in the corresponding key-value inode descriptor 260, which is stored at memory location 0x105 in the SDD 150 in this example, as shown at 505. Some of the elements of FIG. 5 are described above, and therefore, a detailed description of such elements is not repeated.

Figure 6:
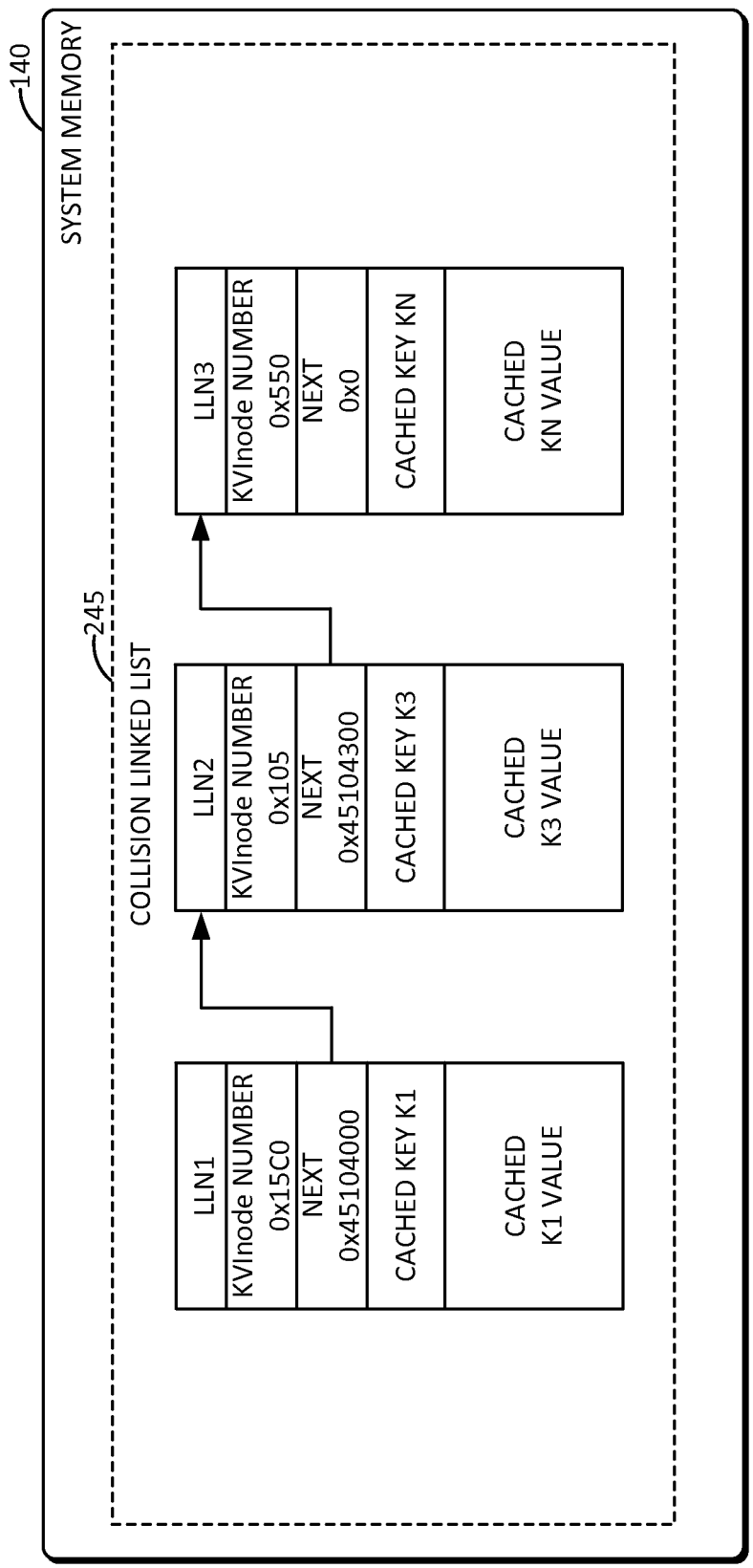
FIG. 6 is another example block diagram of the collision linked list of FIG. 2 in accordance with embodiments of the inventive concept.

FIG. 6 is another example block diagram of the system memory 140 collision linked list 245 of FIG. 2 in accordance with embodiments of the inventive concept. In some embodiments, each of the nodes of the collision linked list 245 can include a cached copy of the key and a cached copy of the key value, that are digitally equivalent to a corresponding key and key value in the corresponding key-value inode descriptor. For example, the cached key K3 in the linked list node LLN2 can be digitally equivalent to the key K3 in the key-value inode descriptor 260. Similarly, the cached K3 value in the linked list node LLN2 can be digitally equivalent to the K3 value in the key-value inode descriptor 260. The key value logic section 130 can walk the collision linked list 245 and compare the requested key with the cached key to distinguish between collided key hashes. In the event of a collision, the key value logic section 130 can immediately retrieve the cached K3 value without the need to access the SDD 150, and transmit the K3 value to the one or more applications 110 of the host 105.

For example, in response to determining that the hashed key K3 collides with another hashed key in the key hash tree 225, the key value logic section 130 can find the hashed key K3 in the collision hash tree 235, access a pointer (e.g., LL_HDR_PTR 420 corresponding to memory location 0x45103530) that is associated with the hashed key K3 in the collision hash tree 235 that points to a collision linked list 245, and walk the collision linked list 245 until a cached key K3 is found that corresponds to the actual key K3. With the match found, the key value logic section 130 can then access the actual cached K3 value stored in the collision linked list node LLN2 itself, without the need to access the SSD 150. Some of the elements of FIG. 6 are described above, and therefore, a detailed description of such elements is not repeated.

Figure 7:
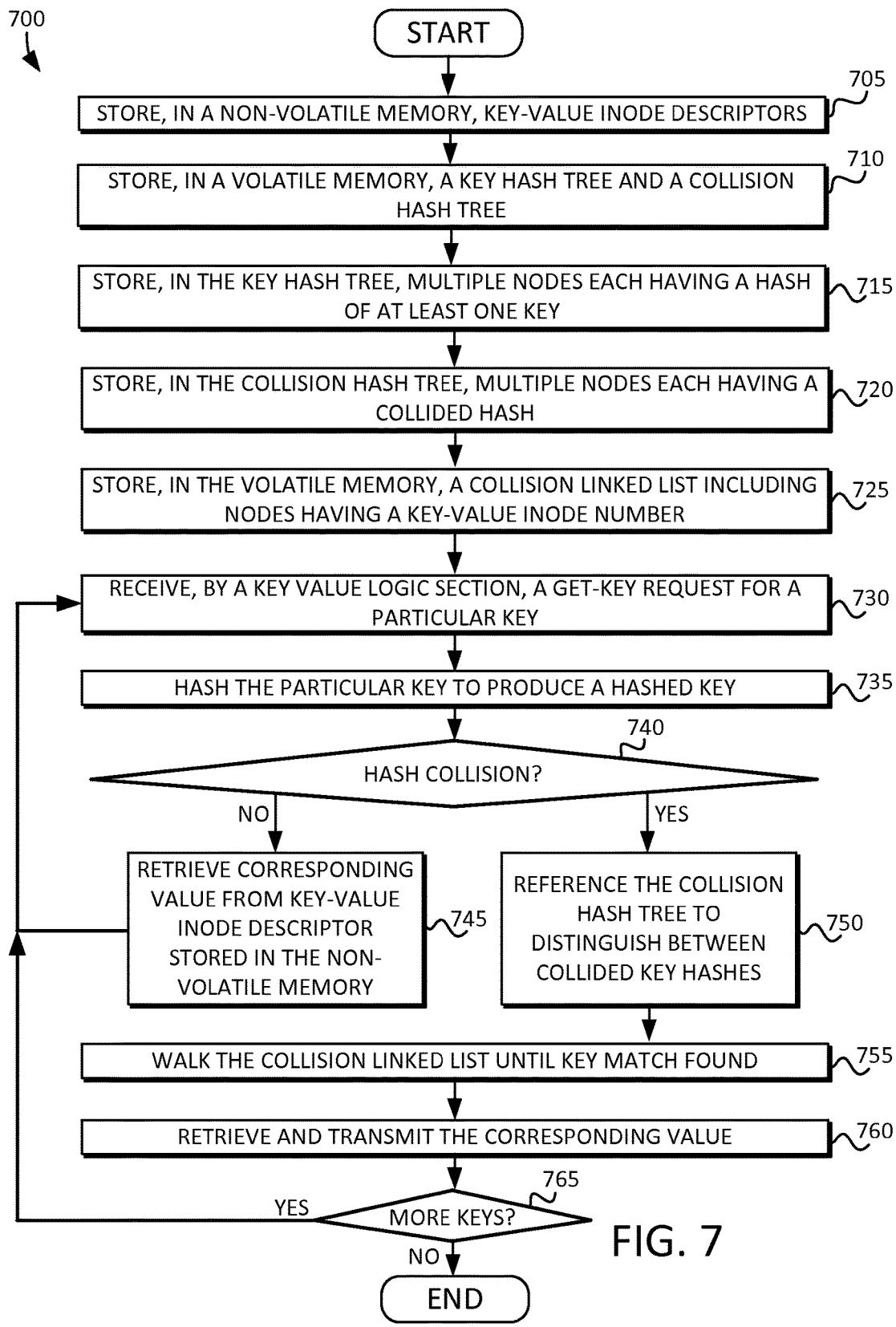
FIG. 7 illustrates a flow diagram including a technique for providing efficient key-value store handling in accordance with embodiments of the inventive concept.

FIG. 7 illustrates a flow diagram 700 including a technique for providing efficient key-value store handling in accordance with embodiments of the inventive concept. The flow begins at 705 where key-value inode descriptors can be stored in a non-volatile memory. Each key-value inode descriptor can include a key from among a plurality of keys and an associated value from among a plurality of values. At 710, a key hash tree and a collision hash tree can be stored in a volatile memory. At 715, multiple nodes each having a hash of at least one key can be stored in the key hash tree. At 720, multiple nodes each having a collided hash can be stored in the collision hash tree. Each of the collided hashes are associated with two or more different keys from among the plurality of keys.

At 725, a collision linked list can be stored in the volatile memory. The collision linked list can include multiple nodes each having a key-value inode number indicating a location of a corresponding key-value inode descriptor from among the plurality of inode descriptors stored in the non-volatile memory. At 730, a get-key request for a particular key can be received by a key-value logic section from one or more applications. The key value logic section can hash the particular key to produce a hashed key at 735.

At 740, a determination can be made whether the hashed key collides with another hashed key in the key hash tree. If NO, meaning no collision in the key hash tree, the flow proceeds to 745 where a corresponding value can be retrieved from the key-value inode descriptor stored in the non-volatile memory, after which the flow can return to 730 to receive additional get-key requests.

Otherwise, if YES, meaning a collision in the key hash tree has occurred, the flow proceeds to 750, where the collision hash tree can be referenced to distinguish between the collided key hashes. The hashed key can be found in the collision hash tree, after which a pointer that is associated with the hashed key that points to a collision linked list can be accessed. At 755, the collision linked list can be walked until a key match is found. In other words, the collision linked list can be traversed until a key-value inode number is found that corresponds to a location of a corresponding key-value inode descriptor associated with the particular key stored in the non-volatile memory. At 760, the corresponding actual value associated with the particular key can be read from the non-volatile memory and transmitted to the application. The flow can then proceed to 730 to service another key value request if it is determined at 765 that there are more keys.

It will be understood that the steps need not occur in the illustrated order, but rather, can occur in a different order and/or with intervening steps.

Figure 8:
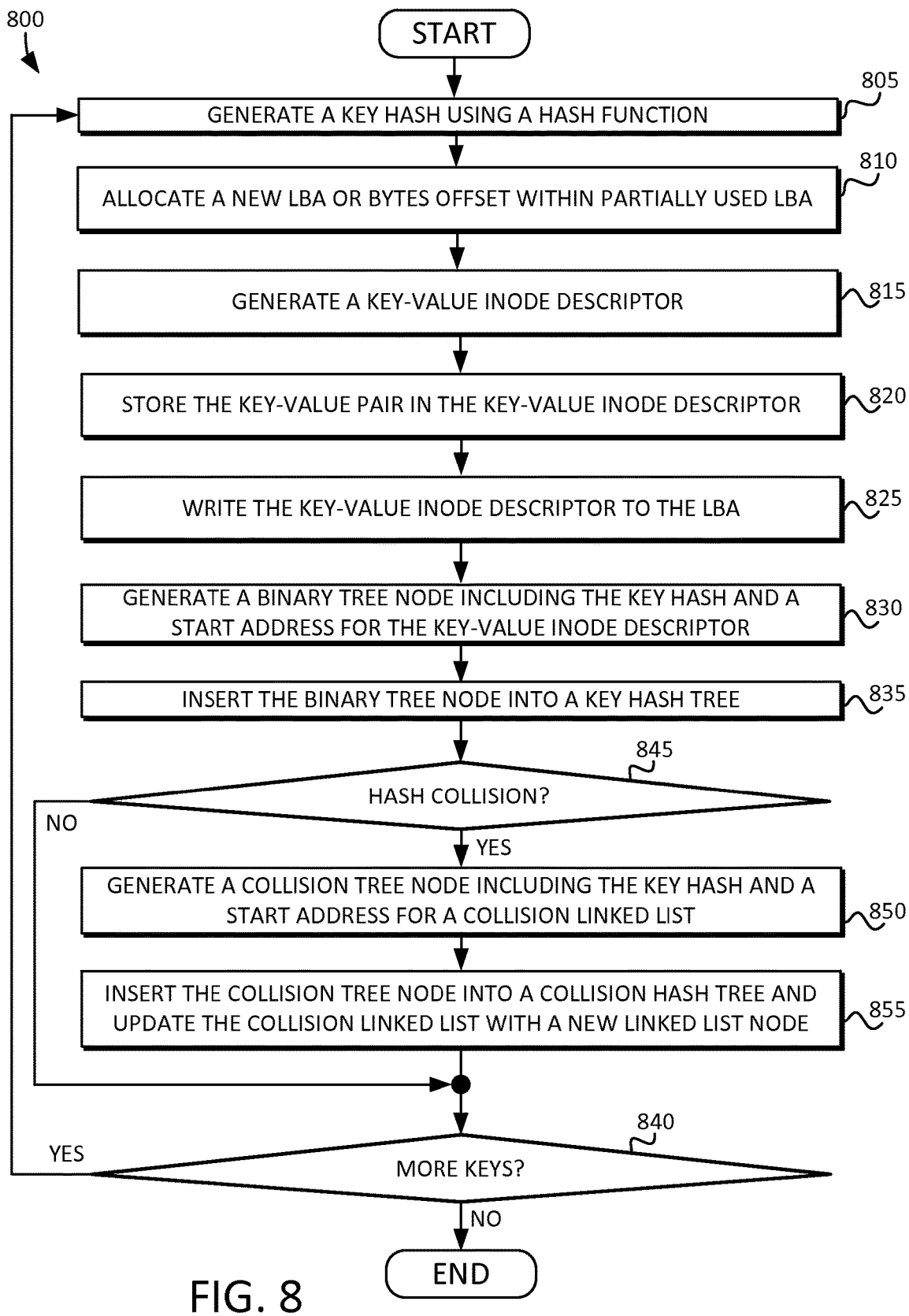
FIG. 8 illustrates a flow diagram including a technique for adding a new key-value pair to the system in accordance with embodiments of the inventive concept.

FIG. 8 illustrates a flow diagram 800 including a technique for adding a new key-value pair to the system in accordance with embodiments of the inventive concept. The flow begins at 805 where a key hash is generated using a hash function. At 810, a new LBA can be allocated. Alternatively or in addition, a bytes offset within a partially used LBA can be allocated or otherwise determined. At 815, a key-value inode descriptor can be generated. At 820, a key-value pair can be stored in the key-value inode descriptor. At 825, the key-value inode descriptor can be written to the new or partially used LBA. At 830, a binary tree node can be generated, which can include the key hash and a start address (i.e., key-value inode number) for the key-value inode descriptor. At 835, the binary tree node can be inserted into a key hash tree in the volatile memory.

At 845, in operation, a determination can be made whether a hash collision has occurred. If YES, the flow can proceed to 850 where a collision tree node can be generated, which can include the key hash and a start address for a collision linked list, after which the flow can proceed to 855, where the collision tree node can be inserted into the collision hash tree, and the collision linked list can be updated with a new linked list node. Otherwise, if NO, meaning that there is no collision of hashes, the flow can proceed to 840.

At 840, a determination can be made whether there are more keys for which additional binary tree nodes and key-value inode descriptors need to be generated. If YES, the flow returns to 805 so that additional key hashes, inode descriptors, and binary tree nodes can be generated. Otherwise, if NO, the technique can end.

It will be understood that the steps need not occur in the illustrated order, but rather, can occur in a different order and/or with intervening steps.

Figure 9:
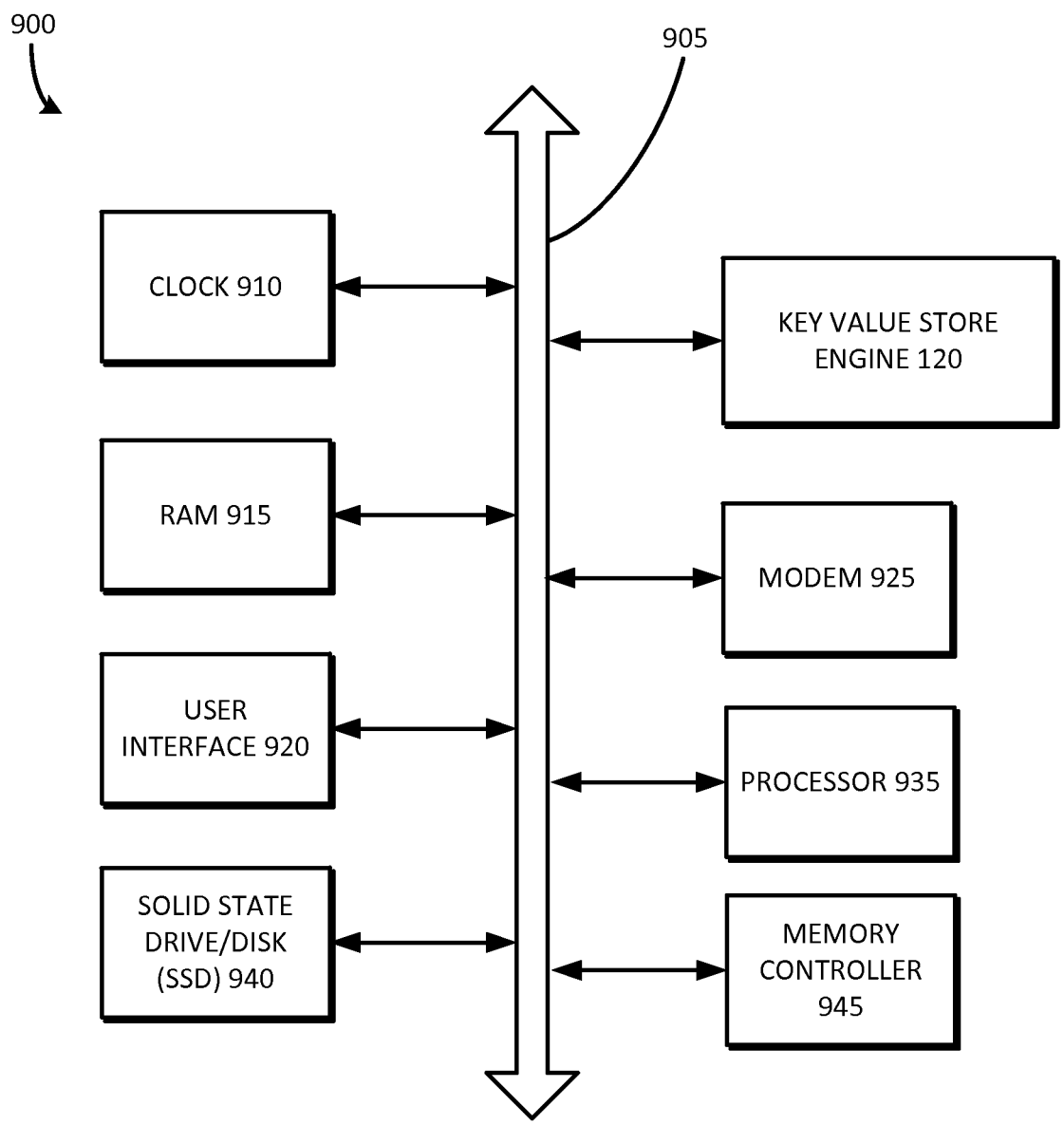
FIG. 9 is a block diagram of a computing system including the key value store engine and/or system as described in detail with reference to FIGS. 1-8 above.

FIG. 9 is a block diagram of a computing system including the key value store engine and/or system as described in detail with reference to FIGS. 1-8 above.

Referring to FIG. 9, the computing system 900 may also include a clock 910, a random access memory (RAM) 915, a user interface 920, a modem 925 such as a baseband chipset, a solid state drive/disk (SSD) 940, a memory controller 945, and/or a processor 935, any or all of which may be electrically coupled to a system bus 905. The key value store engine 120 can correspond to those described in detail above, and as set forth herein, and may also be electrically coupled to the system bus 905. The key value store engine 120 can include or otherwise interface with the clock 910, the random access memory (RAM) 915, the user interface 920, the modem 925, the solid state drive/disk (SSD) 940, the memory controller 945, and/or the processor 935.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A key value store engine, comprising:
a non-volatile memory configured to store a plurality of key-value inode descriptors each including a key from among a plurality of keys and an associated value from among a plurality of values;
a volatile memory configured to store a key hash tree and a collision hash tree, the key hash tree including a first plurality of nodes each having a hash of one of the plurality of keys, the collision hash tree including a second plurality of nodes each having a collided hash associated with two different keys from among the plurality of keys; and
a key value logic section configured to:
receive a get-key request associated with a particular key from among the plurality of keys;
hash the particular key to produce a first hashed key;
determine whether the first hashed key collides with a second hashed key in the key hash tree;
in response to said determining that the first hashed key collides with the second hashed key in the key hash tree, reference the collision hash tree to distinguish between the collided first and second hashed keys;
in response to said determining that the first hashed key collides with the second hashed key in the key hash tree, find the first hashed key in the collision hash tree;
access a pointer that is associated with the first hashed key in the collision hash tree and that points to a collision linked list;
walk the collision linked list until a cached key is found that corresponds to the particular key; and
cause a particular cached value associated with the particular key to be read from the collision linked list.

2. The key value store engine of claim 1, wherein at least one node of the first plurality of nodes includes a collision flag indicating whether two different hashes of the two different keys, respectively, correspond to a collided hash.

3. The key value store engine of claim 1, wherein:
the volatile memory is configured to store the collision linked list including a plurality of linked list nodes each having a key-value inode number indicating a location of a corresponding key-value inode descriptor from among the plurality of key-value inode descriptors stored in the non-volatile memory.

4. The key value store engine of claim 3, wherein:
each of the plurality of linked list nodes of the collision linked list includes a cached copy of a key that is digitally equivalent to a corresponding key in the corresponding key-value inode descriptor.

5. The key value store engine of claim 1, wherein the key value logic section is further configured to:
check a collision flag stored in a node in the key hash tree that is associated with the first hashed key to determine whether the first hashed key collides with the second hashed key.

6. The key value store engine of claim 1, wherein the key value logic section is further configured to:
walk the collision linked list until a key-value inode number is found that corresponds to a location of a corresponding key-value inode descriptor associated with the particular key and stored in the non-volatile memory; and
cause a particular value associated with the particular key to be read from the non-volatile memory.

7. A computer-implemented method for providing efficient key collision handling, the method comprising:

storing, in a non-volatile memory, a plurality of key-value inode descriptors each including a key from among a plurality of keys and an associated value from among a plurality of values;

storing, in a volatile memory, a key hash tree and a collision hash tree;

storing, in the key hash tree, a first plurality of nodes each having a hash of at least one of the plurality of keys;

storing, in the collision hash tree, a second plurality of nodes each having a collided hash that is associated with two different keys from among the plurality of keys;

receiving, by a key value logic section, a get-key request associated with a particular key from among the plurality of keys;

hashing the particular key to produce a first hashed key;

determining whether the first hashed key collides with a second hashed key in the key hash tree; and in response to said determining that the first hashed key collides with the second hashed key in the key hash tree, referencing the collision hash tree to distinguish between the collided first and second hashed keys;

wherein referencing includes:

finding the first hashed key in the collision hash tree;

accessing a pointer that is associated with the first hashed key and that points to a collision linked list;

walking the collision linked list until a key-value inode number is found that corresponds to a location of a corresponding key-value inode descriptor associated with the particular key and stored in the non-volatile memory; and causing a particular value associated with the particular key to be read from the nonvolatile memory.

8. The computer-implemented method for providing efficient key collision handling of claim 7, the method further comprising:

storing, in the volatile memory, the collision linked list including a plurality of linked list nodes each having a key-value inode number indicating a location of a corresponding key-value inode descriptor from among the plurality of key-value inode descriptors stored in the non-volatile memory.

9. A computer-implemented method for providing efficient key collision handling, the method comprising:

generating a key hash of a key using a hash function;

allocating at least one of a new logical block address (LB A) or a bytes offset within a partially used LBA;

generating a key-value inode descriptor;

storing a key-value pair including the key and a value in the key-value inode descriptor;

writing the key-value inode descriptor to the at least one of the new LBA or the bytes offset within the partially used LBA;

generating a binary tree node including the key hash and a key-value inode number for the key-value inode descriptor;

inserting the binary tree node into a key hash tree in a volatile memory;

determining whether a hash collision of the key hash has occurred; and in response to determining that the hash collision has occurred, generating a collision tree node including the key hash and a start address for a collision linked list.

10. The computer-implemented method for providing efficient key collision handling of claim 9, further comprising:

inserting the collision tree node into a collision hash tree.

11. The computer-implemented method for providing efficient key collision handling of claim 10, further comprising:

updating the collision linked list with a new linked list node.

12. The computer-implemented method for providing efficient key collision handling of claim 9, further comprising:

determining whether there are more keys for which additional binary tree nodes and key-value inode descriptors need to be generated;

in response to determining that additional binary tree nodes and key-value inode descriptors need to be generated:

generating a second key hash of a second key using the hash function;

allocating at least one of a second new logical block address (LB A) or a second bytes offset within a second partially used LBA;

generating a second key-value inode descriptor;

storing a second key-value pair including the second key and a second value in the second key-value inode descriptor;

writing the second key-value inode descriptor to the at least one of the second new LBA or the second bytes offset within the second partially used LBA;

generating a second binary tree node including the second key hash and a second key-value inode number for the second key-value inode descriptor; and inserting the second binary tree node into the key hash tree in the volatile memory.

13. The computer-implemented method for providing efficient key collision handling of claim 12, further comprising:

in response to determining that additional binary tree nodes and key-value inode descriptors need to be generated:

determining whether a second hash collision of the second key hash has occurred; and in response to determining that the second hash collision has occurred, generating a second collision tree node including the second key hash and a second start address for a second collision linked list.

* * * * *